(12) United States Patent
Wernet et al.

(10) Patent No.: US 10,895,488 B2
(45) Date of Patent: Jan. 19, 2021

(54) COUPLING ELEMENT FOR A CAPACITIVE FILL LEVEL MEASURING DEVICE

(71) Applicant: Endress+Hauser SE+Co. KG, Maulburg (DE)

(72) Inventors: Armin Wernet, Rheinfelden (DE); Gerd Bechtel, Steinen (DE); Kaj Uppenkamp, Wehr (DE)

(73) Assignee: Endress+Hauser SE+Co. KG, Maulburg (DE)

(*) Notice: Subject to any disclaimer, the term of this patent is extended or adjusted under 35 U.S.C. 154(b) by 212 days.

(21) Appl. No.: 16/093,707

(22) PCT Filed: Mar. 20, 2017

(86) PCT No.: PCT/EP2017/056560
§ 371 (c)(1),
(2) Date: Oct. 15, 2018

(87) PCT Pub. No.: WO2017/186406
PCT Pub. Date: Nov. 2, 2017

(65) Prior Publication Data
US 2019/0078925 A1 Mar. 14, 2019

(30) Foreign Application Priority Data
Apr. 29, 2016 (DE) .......................... 10 2016 107 970

(51) Int. Cl.
*G01F 23/26* (2006.01)
(52) U.S. Cl.
CPC .......... *G01F 23/268* (2013.01); *G01F 23/263* (2013.01); *G01F 23/265* (2013.01)
(58) Field of Classification Search
CPC ..... G01F 23/263; G01F 23/265; G01F 23/268
See application file for complete search history.

(56) References Cited

U.S. PATENT DOCUMENTS 5,212,992 A * 5/1993 Calhoun ................. B01L 3/021
324/690
5,781,019 A * 7/1998 Telder .................... G01F 23/284
324/632
(Continued)

FOREIGN PATENT DOCUMENTS

CN 102183283 A 9/2011
CN 105164505 A 12/2015
(Continued)

OTHER PUBLICATIONS

Search Report for German Patent Application No. 10 2016 107 970.7, German Patent Office, dated Jan. 26, 2017, 7 pp.
(Continued)

*Primary Examiner* — Natalie Huls
(74) *Attorney, Agent, or Firm* — Mark A. Logan; Endress+Hauser (USA) Holding Inc.

(57) ABSTRACT

Apparatus for capacitive determining and/or monitoring of at least one process variable of a medium in a container, comprising at least one sensor unit with at least one sensor electrode, a housing and an electronics unit, wherein the electronics unit is embodied to supply the sensor unit with a high-frequency exciter signal, to receive a response signal from the sensor unit, and to provide at least from the response signal information concerning the fill level of medium in the container. The apparatus includes, furthermore, a coupling element, which is arranged and embodied in such a manner at least at times to establish a conductive connection between at least one portion of the housing and at least one component of the electronics unit and at least at times to effect a capacitive coupling between the two components.

15 Claims, 3 Drawing Sheets

(56) References Cited

U.S. PATENT DOCUMENTS

| | | | | |
|---|---|---|---|---|
| 6,593,857 | B1* | 7/2003 | Roper | G01D 1/00 340/870.3 |
| 2009/0140087 | A1* | 6/2009 | Bonelli | G01F 25/0061 241/29 |
| 2010/0194383 | A1* | 8/2010 | Dieterle | G01F 23/268 324/149 |
| 2011/0199103 | A1 | 8/2011 | Osswald et al. | |
| 2013/0026084 | A1 | 1/2013 | Schneider et al. | |
| 2013/0127156 | A1* | 5/2013 | Osswald | G01F 23/263 285/192 |
| 2015/0346017 | A1* | 12/2015 | LePort | G01F 23/268 250/577 |
| 2016/0047683 | A1* | 2/2016 | Winkens | G01F 23/263 73/304 C |
| 2016/0187179 | A1* | 6/2016 | Hrncir | G01F 23/26 73/304 C |
| 2018/0010947 | A1* | 1/2018 | Roderes | G01F 23/263 |

FOREIGN PATENT DOCUMENTS

| | | |
|---|---|---|
| CN | 106017609 A | 10/2016 |
| DE | 3212434 C2 | 10/1983 |
| DE | 20313695 U1 | 12/2003 |
| DE | 10301051 A1 | 7/2004 |
| DE | 102004008125 A1 | 9/2005 |
| DE | 102011003158 A1 | 7/2012 |
| JP | H0626907 A | 2/1994 |

OTHER PUBLICATIONS

Malucci, Robert D. and Panella, Augusto P., Contact Physics of Capacitive Interconnects, IEEE Transactions on Components, Packaging and Manufacturing Technology, vol. 3, No. 3, Mar. 2013, pp. 377-383.

* cited by examiner

COUPLING ELEMENT FOR A CAPACITIVE FILL LEVEL MEASURING DEVICE

CROSS-REFERENCE TO RELATED APPLICATIONS

The present application is related to and claims the priority benefit of German Patent Application No. 10 2016 107 970.7, filed on Apr. 29, 2016 and International Patent Application No. PCT/EP2017/056560, filed on Mar. 20, 2017 the entire contents of which are incorporated herein by reference.

TECHNICAL FIELD

The present invention relates to an apparatus for capacitive determining and/or monitoring of at least one process variable of a medium in a container. The process variable is, for example, a fill level of medium in the container, the electrical conductivity of the medium or the permittivity of the medium. In the case of a fill level measurement, such can be a continuous fill level determination or the detecting of a predeterminable limit level.

BACKGROUND

Field devices using the capacitive measuring principle are known per se from the state of the art and are manufactured by the applicant in many different embodiments and sold, for example, under the marks, Liquicap, Solicap and Liquipoint.

Capacitive fill-level measuring devices have, as a rule, an essentially cylindrical sensor unit with at least one sensor electrode, which is introducible at least partially into a container. On the one hand, especially for continuous fill level measurement, rod-shaped sensor units extending vertically into the container are widely used. For detecting a limit level, however, also sensor units introducible into the side wall of a container are known.

For preventing accretion formation on the sensor electrode, independently of the embodiment of the sensor electrode, frequently a supplemental electrode, especially a so-called guard electrode, is used, such as described, for example, in DE 32 12 434 C2. The guard electrode is arranged coaxially around the sensor electrode and electrically isolated from such by an insulation. It lies, furthermore, at the same potential as the sensor electrode.

During measurement operation, the sensor unit is supplied with an exciter signal, as a rule, in the form of an alternating current signal. From the response signal received from the sensor unit, then the fill level can be determined. Such depends on the capacitance of the capacitor formed by the sensor electrode and the wall of the container, or by the sensor electrode and a second electrode. Depending on the conductivity of the medium, either the medium or an insulation of the sensor electrode forms the dielectric of the capacitor.

For evaluation of the response signal received from the sensor unit relative to the fill level, either a so-called apparent electrical current measurement or an admittance measurement can be performed. In the case of the apparent electrical current measurement, the magnitude of the apparent electrical current flowing through the sensor unit is measured. Since the apparent electrical current has, however, an active portion and a reactive portion, in the case of an admittance measurement, besides the apparent electrical current, the phase angle between the apparent electrical current and the voltage on the sensor unit is measured. The additional determining of the phase angle permits, moreover, information to be gleaned concerning possible accretion formation, such as is known, for example, from DE102004008125A1.

Various factors are taken into consideration for choosing the frequency of the exciting signal. On the one hand, because of resonance effects, the frequency of the applied alternating voltage should be chosen lower, the greater the length of the sensor unit. On the other hand, however, basically for all sensor units, the influence of an accretion formation lessens with increasing frequency. Entering into this are also influences of the electrical conductivity of the medium.

Known from the state of the art are field devices, which are suited only for operating at one or a few selected, constant frequencies, which is/are selected by striving for the best compromise relative to the above, oppositely moving tendencies. Furthermore, known from DE102011003158A1 is to supply the sensor unit with an exciter signal of variable frequency in the form of a frequency sweep and to select from the response signals belonging to the different frequencies the frequency optimal for the particular application (medium, embodiment of the sensor unit, etc).

Besides choosing a suitable frequency for the exciter signal, capacitively working field devices require various considerations relative to the response signal received from the sensor unit, as a rule, likewise in the form of an alternating current signal. The measuring principle requires the flow of an electrical alternating current from an electronics unit of the field device to the sensor unit and from the sensor unit via the particular medium back to the electronics unit. The so occurring electrical current loop can, depending on embodiment, be susceptible to the in-coupling of disturbance signals, which, in given cases, can negatively affect the accuracy of measurement. Additionally, because of the electrical current loop, also emissions of electromagnetic waves by the field device can occur, which, in turn, disadvantageously affects the electromagnetic compatibility of the device.

In many cases, the electrical current is led via a process connection of the housing as well as via the housing back to the electronics unit. Furthermore, separate contactings are available, which shorten the path of the electrical current signal, compared with the first named case, and, thus, reduce both the possibilites for in-coupling of disturbance signals and, moreover, increase the electromagnetic compatibility of the field device. Conventional contactings between the electronics unit and the housing are effected, for example, using plug contacts, soldered connections or even sliding contacts. Such contactings are, however, often, especially in the case of high requirements for stability and durability of the contacting, only implementable with relatively large effort. In the case of soldered connections, for example, the effort grows with increasing miniaturization in the increasingly constrained conditions of the components. Another problem relative to durability and stability of the connection results, furthermore, in the case, in which the individual components located within the housing of the field device are potted. For example, in the case of sliding contacts, wear can occur as time goes on. In the case of plug contacts, in turn, especially because of the pointwise contacting, the casting and subsequent working and flow of the potting compound can lead to forces on the contact location, which degrade the contact or, in given cases, even interrupt it.

SUMMARY

An object of the present invention is to provide a simple, reliable and lasting contacting between the housing and the electronics unit of a capacitive field device.

This object of the invention is achieved by an apparatus for capacitive determining and/or monitoring of at least one process variable of a medium in a container, comprising at least one sensor unit with at least one sensor electrode, a housing and an electronics unit, wherein the electronics unit is embodied
- to supply the sensor unit with a high-frequency exciter signal,
- to receive a response signal from the sensor unit, and
- to provide at least from the response signal information concerning the fill level of medium in the container.

Provided for the apparatus is, furthermore, a coupling element, which is arranged and embodied in such a manner at least at times to establish a conductive connection between at least one portion of the housing and at least one component of the electronics unit and at least at times to effect a capacitive coupling between the two components.

The coupling element cares preferably for an electrical contact between the two components, the housing and the electronics unit. Otherwise, there is still at least a capacitive coupling. At least one portion of the coupling element and at least one portion at least one of the two components thus form, in this case, a capacitor element. Thus, at all times, an appropriate flow of electrical current signal along a predetermined electrical current loop can be assured via the coupling element. The various above sketched possible causes for a degrading of an electrical contacting are thus obviated by the use of a coupling element of the invention.

A goal of the present invention is essentially to provide a robust, stable and simultaneously simply constructed contacting. Especially, it can, furthermore, be assured that the electrical current loop passed through by the appropriate electrical current signal is as short as possible. When the electrical contact by means the contacting unit is degraded or interrupted, there is always still a capacitive coupling. Since the capacitive coupling, furthermore, basically grows with frequency of the electrical current signal, the high-frequency exciting signal provided in the present invention assures that the coupling for maintaining the short electrical current loop is always sufficient.

The coupling element of the invention is preferably releasably securable to the or in the housing. It is especially securable by shape fitting to the or in the housing.

In an additional embodiment, at least the coupling element and the housing are, at least, in each case, in a coupling region, so embodied that their geometries, at least in these coupling regions, are matched to one another, especially are complementary to one another.

In an additional preferred embodiment, the coupling element and the housing form, at least in the two coupling regions, at least at times, an electrically conductive contact and, at least at times, a capacitor element. The electrical contact can, in such case, be either a point contact, a linear contact or even an areal contact.

In the case, in which the housing has, for example, at least in a portion, a planar surface, the coupling element has, for example, likewise a planar surface and is then so embodied that the two planar surfaces, when the coupling element is secured to the or in the housing, lie opposite one another and, at least at times and at least partially, touch one another. Between the coupling element and the housing, there is, thus, at times, a conductive connection and, at times, a capacitive coupling. If the electrical contact, which is effected by the touching of the two coupling regions, is no longer present, then the two coupling regions still form a capacitor element in the form of a plate capacitor and effect a capacitive coupling. The size of the capacitive coupling depends thus also on the area of the two coupling regions.

In general, the geometry and dimensioning of the coupling element is basically matched, on the one hand, to the geometry of the housing and/or the electronics unit at least in that subsection/those subsections, in which a contacting should be made. The capacitive coupling depends, however, furthermore, on the two coupling regions, especially their separation from one another in the coupling and on the surface area of the two mutually facing surfaces, since the capacitor element is defined especially by the two coupling regions.

For the contacting, or coupling, as the case may be, between the coupling element and the electronics unit, a wide variety of embodiments are possible, which all fall within the scope of the present invention. Fundamentally, the same thinking holds as for the contacting, or coupling, between the coupling element and the housing. However, it is in many cases sufficient, when the coupling element has either with the housing or with the electronics unit an electrical connection and a capacitive coupling. The second connection, in each case, can also be purely conductive.

An embodiment of the apparatus of the invention provides that the two coupling regions are so dimensioned that in the case of the capacitive coupling the reactance of the coupling element is small in comparison with the impedance of the medium and/or the impedance of an insulation of the sensor unit. The reactance of the coupling element is connected in series with the impedance of the medium. An as small as possible reactance enables correspondingly an as efficient as possible signal transmission.

In an additional embodiment of the invention, the coupling region of the housing and the coupling region of the coupling element are essentially cylindrically embodied, wherein at least the coupling region of the coupling element is releasably introducible into the housing in such a manner that the surface of the coupling region of the housing facing the housing interior contacts the surface of the coupling region of the coupling element facing the housing interior at least partially and at least at times. The housing thus includes at least one cylindrical subsection, within which the likewise cylindrically embodied coupling element can be located. The radii of the cylindrical subsection of the housing and the subsection of the coupling element are, in such case, so matched to one another that the coupling element can be secured in such a manner within the housing that the housing and the coupling element contact one another at least partially and at least at times in the two coupling regions, which comprise, in each case, at least one section of the cylindrical subsections.

In an additional embodiment of the apparatus of the invention, the coupling element includes a contacting unit, by means of which an electrical connection, especially a releasable, electrical connection, can be established between the coupling element and the component of the electronics unit. In this case, there is thus a conductive connection between the coupling element and the electronics unit, especially a circuit board of the electronics unit.

In such case, it is advantageous that the contacting unit is electrically contacted with the component of the electronics unit by means of a plug-, solder- or crimped connection. For example, the contacting unit can have at least one contact strip, a contact blade, a contact lug, a contact pin or even a contact spring.

In an additional embodiment, the coupling element is manufactured of an electrically conductive material, especially copper, tin, silver, gold or an alloy of at least two of these elements, such as, for example, brass.

Advantageously, the at least one component of the electronics unit is a circuit board. The coupling region of the coupling element can be arranged, for example, at least partially around the circuit board within the housing.

In a preferred embodiment, the housing includes a process adapter, by means of which the apparatus is securable at or on the container, and the process adapter is at least partially in electrical contact with the medium and/or with the container, when the apparatus is secured at or on the container. The container, in which the medium is located, can, in such case, be manufactured either of an electrically conductive or an electrically insulating material. At least the process adapter should, however, as a rule, be manufactured of an electrically conductive material.

In an additional embodiment, the sensor unit includes at least two electrodes. For example, the two electrodes are a sensor electrode and a guard electrode.

The process variable is advantageously a fill level of medium in the container, especially a predeterminable fill level, the electrical conductivity of the medium, or the permittivity of the medium.

BRIEF DESCRIPTION OF THE DRAWINGS

The invention will now be more exactly described based on the appended drawing, the figures of which show as follows.

DETAILED DESCRIPTION

Figure 1:
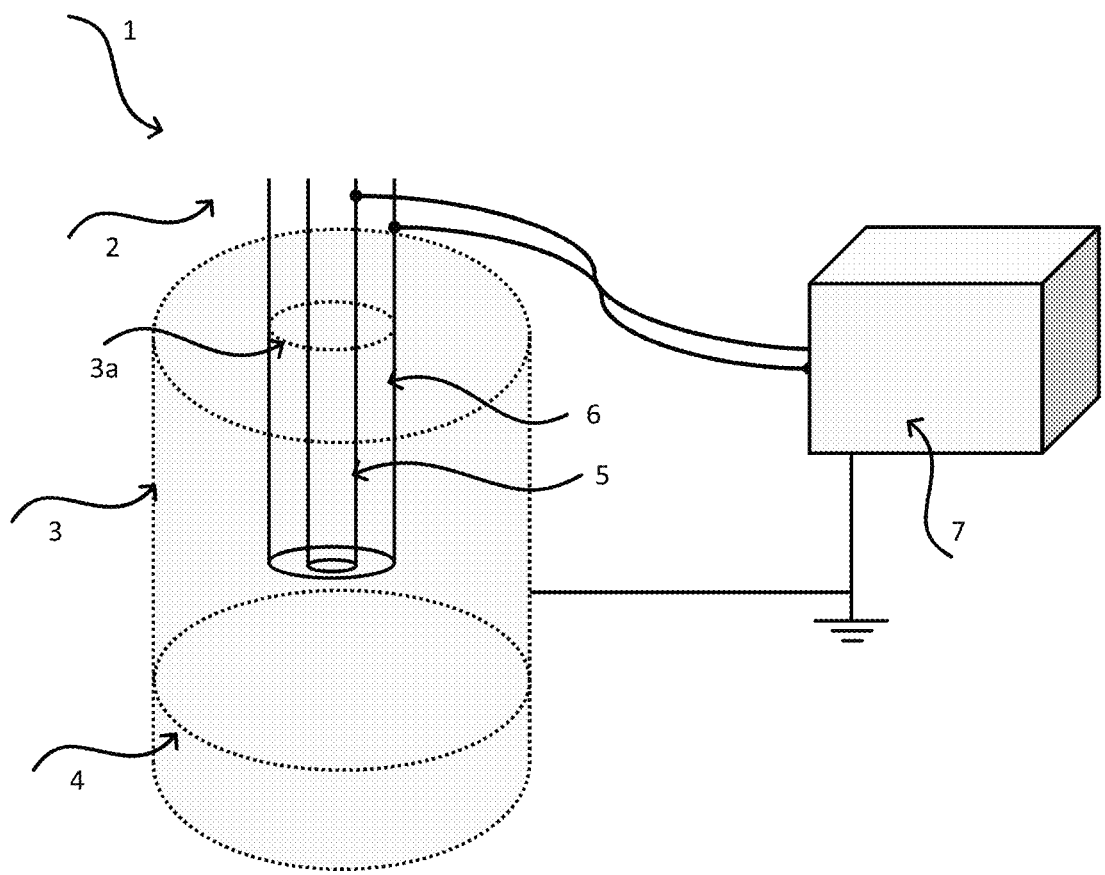
FIG. 1 shows a schematic representation of a capacitive fill-level measuring device of the state of the art.

FIG. 1 shows a schematic drawing of a typical capacitive measuring principle based field device 1 of the state of the art. This example includes a sensor unit 2 having two cylindrically embodied electrodes 5, 6, which via a process connection 3a protrudes from the top inwardly into a container 3 filled partially with a medium 4. Also flush sensor units, which essentially terminate with the wall of the container 3, or sensor units, which are introduced into the container 3 via a side wall of the container 3, can be used.

The sensor unit 2 in the present example is composed of a sensor electrode 5 and a guard electrode 6 coaxially surrounding the sensor electrode 5 and insulated therefrom. Both electrodes 5,6 are connected electrically with an electronics unit 7, which is responsible for signal registration,—evaluation and/or—feeding. Especially, the electronics unit 7 determines and/or monitors the fill level of medium 4 in the container 3 based on the response signal received from the sensor unit 2.

Figure 2A:
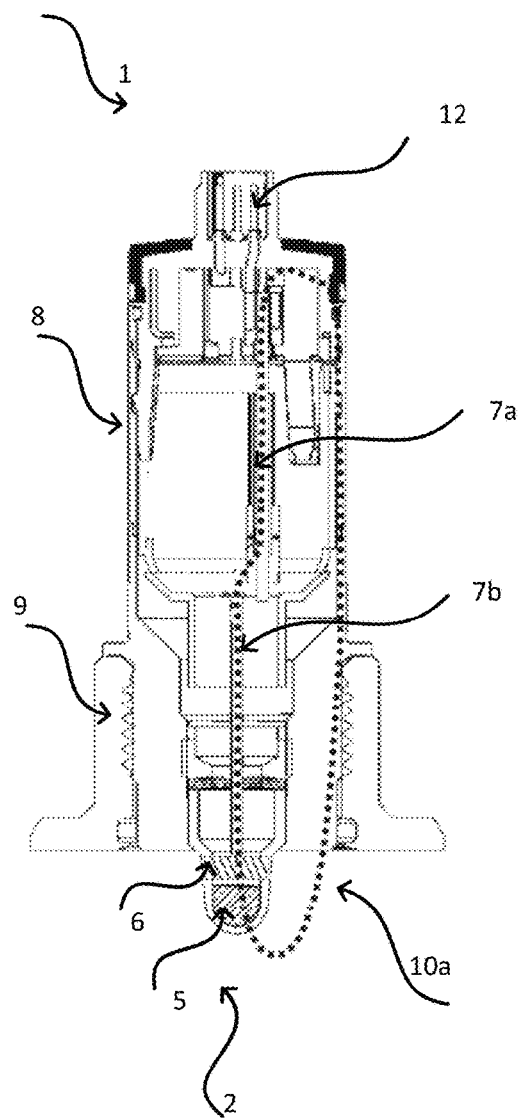
FIG. 2 shows a schematic drawing of two capacitive fill-level measuring devices with electrical current loops shown for the exciter signal and response signal (a) without coupling element and (b) with coupling element of the invention.

FIG. 2a likewise shows a capacitive fill-level measuring device 1 with a sensor unit 2, which includes a sensor electrode 5 and a guard electrode 6. The guard electrode 6 is electrically completely insulated from sensor electrode 5 and serves for compensating accretion formation. The guard electrode 6 is, in such case, preferably operated at the same potential as the sensor electrode 5, such as described, for example, in DE 32 12 434 C2.

The housing 8 includes a process adapter 9 for connecting the device 1 to a process connection of a container 3, which is filled at least partially with a medium 4. The measuring device 1 is supplied with electrical energy via the supply lines 12. In given cases, furthermore, communication with a superordinated unit, such as, for example, a process control system or a computer [not shown] by means of the supply lines 12, can be carried out, such as, for example, a transmission of measurement signals, parameter data or the like.

The exciter signal in the form of an alternating current signal flows in the case of the embodiment of FIG. 2a along the electrical current loop 10a through a large part of the housing 8 and via the electronics unit 7 (here, by way of example, present on the two circuit boards 7a and 7b). Such an arrangement or electrical current loop such as the electrical current loop 10a, can, on the one hand, be disadvantageous relative to the electromagnetic compatibility of the field device 1. In the case of a high-frequency exciting signal, the field device of FIG. 2a represents a disturbance source due to emissions of electromagnetic waves.

Figure 2B:
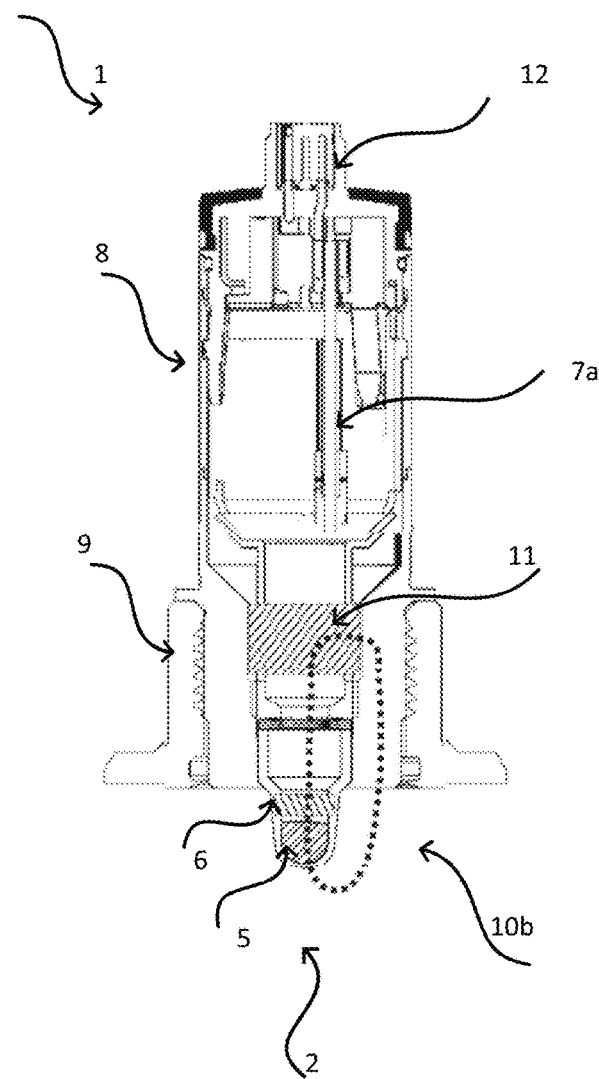

In contrast with FIG. 2a, the field device 1 shown in FIG. 2b includes a coupling element 11 of the invention but otherwise has equal construction. Equal reference characters are therefore not explained here anew. Coupling element 11 effects that the exciter signal, or response signal, passes, instead of through the electrical current loop 10a, through an essentially shorter electrical current loop 10b. On the one hand, use of the coupling element 11 advantageously increases the electromagnetic compatibility of the field device, especially relative to the emission of electromagnetic waves. A further significant advantage effected by the coupling element 11 relates to the different signal paths within the field device 1. While the response signal, thus the actual measurement signal, is fed back via the coupling element 11 to the electronics unit 7, the supplying of power to the field device occurs via the supply lines 12. If the electronics unit 7 includes at least one input filter [not shown], disturbance signal fractions, which can couple via the supply lines 12 into the field device 1, can be reduced or even eliminated. In this case, the signal paths can advantageously be isolated into a measuring circuit along the electrical current loop 10b and into a supply/communication circuit along the supply lines 12. The application of at least one input filter does not degrade the actual measurement signal.

Figure 3A:
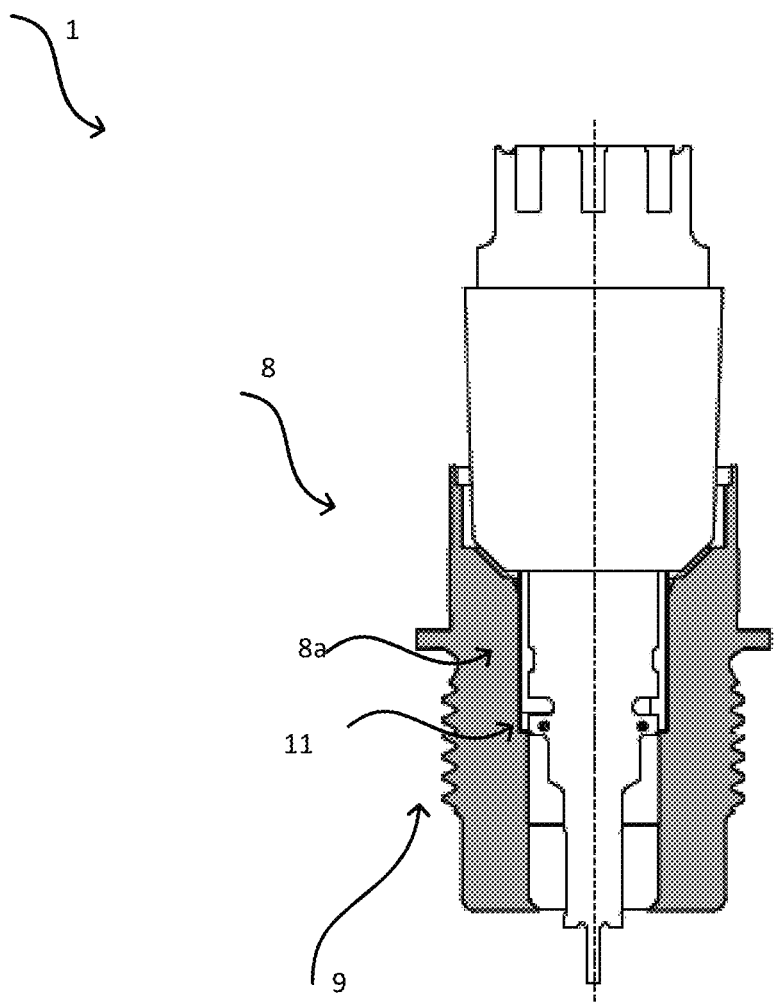
FIG. 3 shows (a) a sectional illustration of a capacitive fill-level measuring device having a coupling element and (b) a possible embodiment of a coupling element in perspective view.
Figure 3B:
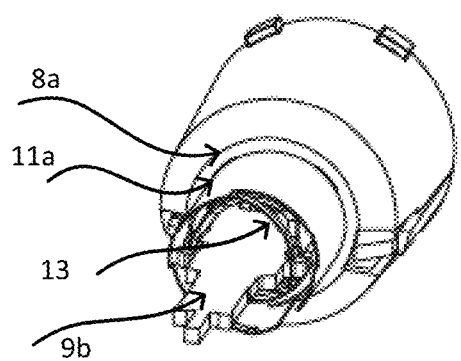

A preferred embodiment of a coupling element 11 of the invention is shown in FIG. 3. While FIG. 3a shows a capacitive field device 1 with the coupling element 11 in a sectional illustration, a more detailed view of the coupling element 11 is provided by the perspective drawing in FIG. 3b. The housing 8 of the field device 1 is cylindrically embodied at least in a subsection at least partially defining the coupling region 8a of the housing. Coupling element 11 is likewise cylindrically embodied in a subsection, which at least partially defines its coupling region 11a, and has dimensions, which fit those of the housing 8. Coupling element 11 is essentially accurately fit into the housing 8 of the field device 1, such that the two coupling regions 8a and 11a at least at times and partially contact and form an electrical connection. In the other case, the two coupling regions 8a and 11a form a capacitor element in the form of a cylindrical capacitor, via which a capacitive coupling between the housing 8 and the coupling element 11 is effected. The capacitive coupling grows, on the one hand, with the frequency of the exciting signal and, on the other hand, with the surface areas of the two coupling regions 8a and 11a. From this there results that the dimensions of the coupling element 11 can be selected smaller, the greater the frequency of the exciting signal.

Coupling element 11 includes, furthermore, a contacting unit 13 for electrical connection with a circuit board 9b of the electronics unit 7. For this embodiment, there is always a conductive connection between the coupling element 11 and the circuit board 9b. In contrast, there is between the coupling element 11 and the housing, at times, especially when the two coupling regions 11a and 8a contact, an electrical connection via area. Various influences can, however, bring about that the touching of the two coupling regions 11a and 8a is no longer present. This can result, for example, from manufacturing tolerances of the coupling element 11 or of the housing 8. A lack of contact can, however, also result from the potting of the individual components within the housing 8. Moreover, different coefficients of expansion of the individual components can upon the occurrence of larger temperature gradients lead to the fact that the coupling element 11 and the housing 8 are no longer or no longer completely in contact. In this case, there is between the two components, which both at least in the coupling regions 11a and 8a are manufactured of an electrically conductive material, still a capacitive coupling, which assures that the alternating current signal still passes through the short electrical current loop 10b.

The invention claimed is:

1. An apparatus for capacitive determining of a process variable of a medium in a container, comprising:
   a sensor unit including a sensor electrode;
   a housing;
   an electronics unit, wherein the electronics unit is embodied to supply the sensor unit with a radio frequency exciter signal, to receive a response signal from the sensor unit, and to determine from the response signal information concerning the fill level of medium in the container; and
   a coupling element arranged and embodied to enable a conductive connection between the housing and a component of the electronics unit and to enable a capacitive coupling between the housing and the component of the electronics unit.

2. The apparatus as claimed in claim 1, wherein the coupling element is securable releasably to the or in the housing.

3. The apparatus as claimed in claim 1, wherein the coupling element has a coupling region and the housing has a coupling region, wherein the geometry of the coupling element coupling region and the geometry of the housing coupling region are matched to one another and are complementary to one another.

4. The apparatus as claimed in claim 3, wherein the coupling element coupling region and the housing coupling regions form, at least at times, an electrically conductive contact, and, at least at times, a capacitor element.

5. The apparatus as claimed in claim 4, wherein the coupling element coupling region and the housing coupling region are so dimensioned that in the case of the capacitive coupling, the reactance of the coupling element is smaller than an impedance of the medium and smaller than an impedance of an insulation of the sensor unit.

6. The apparatus as claimed in claim 3, wherein the coupling region of the housing and the coupling region of the coupling element are cylindrically embodied, and wherein the coupling region of the coupling element is releasably introducible into the housing such that a surface of the coupling region of the housing facing a housing interior contacts a surface of the coupling region of the coupling element facing the housing interior at least partially and at least at times.

7. The apparatus as claimed in claim 1, wherein the coupling element includes a contacting unit by which a releasable electrical connection can be established between the coupling element and the component of the electronics unit.

8. The apparatus as claimed in claim 7, wherein the contacting unit is electrically contacted with the component of the electronics unit by a plug, solder, or crimped connection.

9. The apparatus as claimed in claim 1, wherein the coupling element is manufactured of an electrically conductive material.

10. The apparatus as claimed in claim 9, wherein the electrically conductive material is one of: copper, tin, silver, and gold.

11. The apparatus as claimed in claim 9, wherein the electrically conductive material is an alloy of at least two of: copper, tin, silver, and gold.

12. The apparatus as claimed in claim 1, wherein the component of the electronics unit is a circuit board.

13. The apparatus as claimed in claim 1, wherein the housing includes a process adapter, by which the apparatus is securable at or on the container, and the process adapter is at least partially in electrical contact with the medium and/or with the container, when the apparatus is secured at or on the container.

14. Apparatus as claimed in claim 1, wherein the sensor unit includes at least two electrodes.

15. The apparatus as claimed in claim 1, wherein the process variable is a fill level of the medium in the container, a predeterminable fill level of the medium in the container, an electrical conductivity of the medium, or a permittivity of the medium.

* * * * *